US012801661B2

(12) United States Patent
Guo et al.

(10) Patent No.: US 12,801,661 B2
(45) Date of Patent: Nov. 17, 2026

(54) IMAGE SHARING METHOD AND DEVICE

(71) Applicant: Orange, Issy-les-Moulineaux (FR)

(72) Inventors: Zhihong Guo, Beijing (CN); Liang Han, Beijing (CN)

(73) Assignee: Orange, Issy-les-Moulineaux (FR)

( * ) Notice: Subject to any disclaimer, the term of this patent is extended or adjusted under 35 U.S.C. 154(b) by 114 days.

(21) Appl. No.: 18/292,273

(22) PCT Filed: Jul. 27, 2022

(86) PCT No.: PCT/IB2022/000427
§ 371 (c)(1),
(2) Date: Jan. 25, 2024

(87) PCT Pub. No.: WO2023/007243
PCT Pub. Date: Feb. 2, 2023

(65) Prior Publication Data

US 2024/0340381 A1 Oct. 10, 2024

(30) Foreign Application Priority Data

Jul. 29, 2021 (WO) ................ PCT/CN2021/109271

(51) Int. Cl.
*G06F 16/50* (2019.01)
*G06F 16/538* (2019.01)
*G06F 16/58* (2019.01)

(52) U.S. Cl.
CPC ............ *G06F 16/58* (2019.01); *G06F 16/538* (2019.01)

(58) Field of Classification Search
CPC ............................... G06F 16/538; G06F 16/58
See application file for complete search history.

(56) References Cited

U.S. PATENT DOCUMENTS 8,531,478 B2 * 9/2013 Lee ........................ G06V 20/30 345/619
2011/0066627 A1 * 3/2011 Seung ..................... G06F 16/58 715/848

OTHER PUBLICATIONS

Esteban Vazquez-Fernadez et al., "Built-In Face Recognition for Smart Photo Sharing in Mobile Devices", Multimedia and Expo (ICME), 2011 IEEE International Conference on, IEEE, Jul. 11, 2011, pp. 1-4.
Notification of Transmittal of the International Search Report and The Written Opinion of the International Searching Authority, or The Declaration for International Application No. PCT/CN2021/109271 dated Jan. 31, 2022.
International Search Report and Written Opinion for International Application No. PCT/IB2022/000427 dated Nov. 4, 2022.

* cited by examiner

*Primary Examiner* — Kristopher Andersen
(74) *Attorney, Agent, or Firm* — Knobbe, Martens, Olson & Bear, LLP

(57) ABSTRACT

A method for operating an electronic device, where the method includes: determining (a), by a processing unit of the electronic device, that a selected image represents at least one target person; and proposing (b), by a user interface of the electronic device, to share the selected image with a device used by the target person, where (b) comprises adapting (b1) a subset of the collection of images based on people represented in the images as a function of the target person and displaying, on a user interface of the electronic device, the subset of the collection of images, the displayed subset of images being arranged according to the adapting.

15 Claims, 3 Drawing Sheets

IMAGE SHARING METHOD AND DEVICE

CROSS-REFERENCE TO RELATED APPLICATIONS

This application is filed under 35 U.S.C. § 371 as the U.S. National Phase of Application No. PCT/IB2022/000427 entitled "IMAGE SHARING METHOD AND DEVICE" and filed Jul. 27, 2022, and which claims priority to PCT/CN2021/109271 filed Jul. 29, 2021, each of which is incorporated by reference in its entirety.

BACKGROUND

Technical Field

The field of this development is that of audiovisual contents.

More particularly, the development relates to a method for operating a mobile terminal to share images.

Related Art

Mobile terminal such as smartphones are widely used for taking pictures, and generally end up storing thousands of photos and other downloaded images.

When a user wants to share specific images, such as photos of a given person (a relative, a friend, etc.), the user has no choice but to browse through a gallery of thumbnails previews up to find the target images (which sometimes requires opening the images to confirm, as the thumbnails are really small), which is inconvenient.

The mobile terminals are generally provided with image management applications for facilitating the handling of large numbers of images, which further allows to filter the photos by date, place, album or collection, but this does not help much when for instance photos of a given person are wanted.

The most recent image management applications are provided with fully or semi-automated facial recognition algorithms. In more details, these applications are able to recognize faces in images and to construct "sets" of images representing the same face.

This improves the situation, but if the user wishes to share the photos of a given person they still have to browse through the recognized faces up to find the corresponding set, select these photos and send them to the right contact.

There is consequently a need for a method allowing to easily and efficiently browse and share through images collections.

SUMMARY

For these purposes, the present development provides a method for operating an electronic device characterized in that it comprises the steps of: determining, by means of a processing unit of the electronic device, that an image, selected among a collection of images, represents at least one target person; and proposing, by means of a user interface of said electronic device, to share said selected image with a device used by said target person, wherein the step of proposing comprises adapting a subset of said collection of images based on people represented in said images as a function of said target person and displaying, on a user interface of the electronic device, said subset of said collection of images, the displayed subset of images being arranged according to said adapting.

Preferred but non limiting features of the present development are as follow:

- The method further comprises a step of detecting a trigger event performed on the electronic device, the step of proposing to share said selected image with a device used by said target person being performed in response to said detection of a trigger event;
- Proposing to share said selected image with a device used by the target person comprises (b2) providing a personalized sharing button, on said user interface of the electronic device, for directly sending said selected image to the device used by the target person;
- The method further comprises a step of sending said selected image to said device used by said target person;
- Contact details of the target person are associated, in the electronic device, with an identifier of the target person for sending the selected image to the device used by said target person;
- The determining step comprises detecting the selection of at least one image;
- The determining step comprises performing on at least the selected image a face recognition algorithm in order to recognize at least one person in said selected image;
- Contact details of at least said target person are associated, in the electronic device, with a reference face of said target person and/or with parameters characterizing said reference face, the determining that said selected image represents at least a target person being performed based on said reference face and/or parameters;
- Adapting a subset of said collection of images comprises selecting and/or sorting said subset;
- Adapting a subset of said collection of images comprises selecting said subset of said collection of images based on people represented in the images as a function of said target person, in particular selecting the subset of said collection of images representing said target person.

In a second aspect, the development provides an electronic device characterized in that it comprises a processing unit configured to determine that an image, selected among a collection of images, represents at least one target person and a user interface configured to propose to share said selected image with a device used by said target person and to display a subset of said collection of images, said displayed subset of images being arranged according to an adapting of said subset based on people represented in said images as a function of said target person.

According to a third and a fourth aspects, the development provides a computer program product, comprising code instructions for executing a method according to the first aspect for operating an electronic device; and a computer-readable medium, on which is stored a computer program product comprising code instructions for executing a method according to the first aspect for operating an electronic device.

BRIEF DESCRIPTION OF THE DRAWINGS

The above and other objects, features and advantages of this development will be apparent in the following detailed description of an illustrative embodiment thereof, which is to be read in connection with the accompanying drawings wherein.

DETAILED DESCRIPTION OF CERTAIN ILLUSTRATIVE EMBODIMENTS

Architecture

Figure 1:
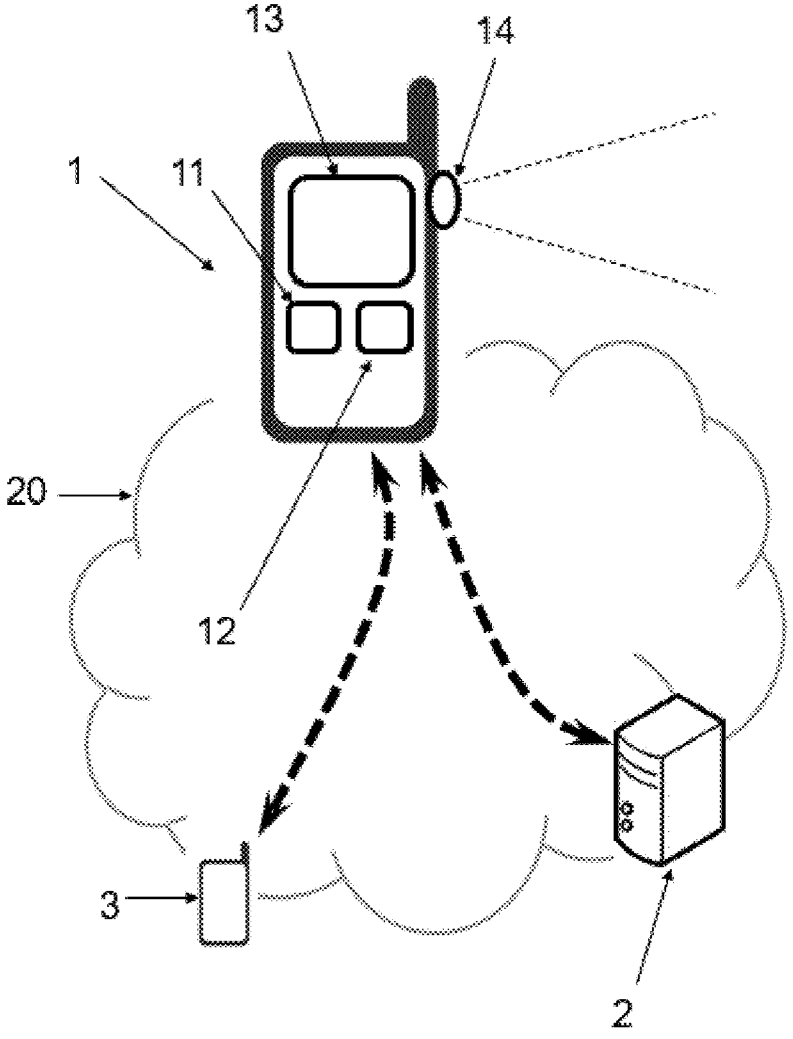
FIG. 1 illustrates an example of architecture in which the method according to the development is performed.

The present development relates to a method for operating an electronic device 1 to share at least one image, as represented by FIG. 1.

Said image(s) to be shared are preferably assumed to belong to a collection of images which can be browsed on the device 1. In other words, the device 1 is supposed to have access to said collection of images, which are hosted locally (images are stored on a storage unit 12 of the device 1) and/or remotely (images are stored on a remote server 2, e.g. in the so-called "cloud"). Note that there may be a hybrid mode wherein the device 1 stores thumbnails of images (i.e. smaller and lower quality versions of the images) but not the images themselves, which may then be stored remotely. The device 1 may be connected to the server 2, in particular through a network 20 (notably via a mobile network, in particular a GSM/UMTS/LTE/5G network). As it will be explained, at least one second electronic device(s) 3 (such as the terminal of a friend or a relative) is typically also connected to the device 1 through the network 20.

Said images are preferably photos, i.e. pictures of a live scene, in particularly representing at least one person, but it is to be understood that collection of images generally also includes images which are not photos such as drawings, memes, screenshots.

The electronic device 1 is typically a smartphone, a tablet, a digital camera or any other personal terminal of a user. It comprises at least a processing unit 11 (typically a processor) and a user interface 13 (typically a screen, possibly touch sensitive), and may advantageously further comprise a storage unit 12 (a memory, for instance flash memory), at least one built-in camera 14 (for directly acquiring images and adding them to the collection), etc. In a preferred embodiment, said built-in camera 14 is a front camera able to acquire a photo of the person using the device 1.

Method

Figure 2:
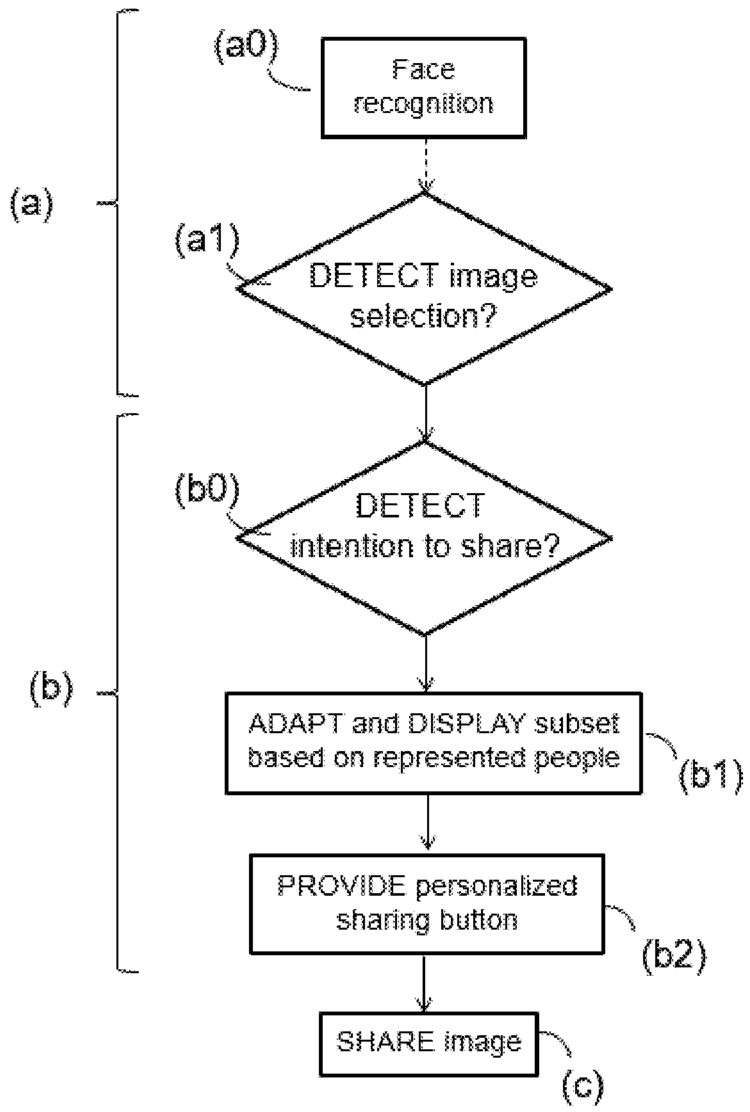
FIG. 2 is a diagram representing steps of a preferred embodiment of a method according to the development.

With reference to FIGS. 2, the present method is performed by the processing unit 11 of the device 1, and is implemented either by an application of the terminal 1 intended to handle collections of images (an image management application etc.), a dedicated software application, or directly by the operating system.

The method starts with a step (a) of determining that a selected image (from said collection of images) represents one or more target person. By target person, it is meant any person of the image whose identity can be assessed: there may be a plurality of target people in the case of a group photo, but not any people represented by an image is a target person, because some people can be unknown or not identifiable (for instance people in the background), see below. The target person advantageously belongs to a contact list of the device 1, see below.

Step (a) preferably comprises two actions that may be performed in any order:

- detecting (a1) the selection of at least one image, such as touching a thumbnail of the image on the interface 13 (visible on FIG. 3), note that a plurality of images could be selected at once;
- identifying (a0) at least one person represented by said image(s) as target person, in particular by performing a face recognition algorithm.

Various embodiments (corresponding to the possible orders of these actions, including a two-phase face recognition) will be described in more details below. In FIG. 2, target person(s) are identified (a0), e.g. by face recognition algorithm, is performed before any image is selected (a1).

The device 1 is typically configured to command displaying, on said interface 13, said collection of images or at least a selected subset of said collection of images, to browse these images. The collection may be "adapted", meaning that the images of the collection may be filtered (i.e. a subset of images from said collection can be selected) and/or sorted (i.e. their order in the collection be changed) based on one or more criteria such as location, date, etc. To this end, the images may be associated to one or more tags.

Note that the collection (and even a selected sub-set) could include thousands of images, and it generally not possible to display all of them simultaneously, so that it will be understood that they could be displayed along a plurality of pages, in a scrollable fashion.

In a preferred embodiment, thumbnails of a set number (referred to as "n") of images are actually displayed at once (i.e. on a single displayed page), as a preview of these images, in a scrollable fashion as mentioned. Said number n may depend from the size of the interface and configuration parameters possibly chosen by the user. When the user scrolls, the thumbnails change. For instance, let's assume that n=9 and the interface is configured to display a matrix of 3×3 thumbnails (see the example of left view of FIG. 3).

In any case, the user may select a given image by clicking its thumbnail, which has generally the effect of enlarging it full screen size (the original image, rather than the thumbnail, is thus displayed by the interface 13), or just "ticking" it. Note that several images can generally be selected one by one (they are all "ticked").

In a following step (b), the method comprises proposing to share said selected image with a device 3 used by the target person. In the case of a plurality of target people (in particular if several images are selected at once), said selected image(s) may be proposed to be shared with any one of the device used by these target people.

By "proposing to share the selected image with a device 3 used by the target person", it is meant adapting the user interface 13, and in particular its displaying when it is implemented using a screen, so as to allow a user to directly share the selected image with the device 3 used by the target person. In a particular embodiment, a subset of images may be displayed and the user may be given the possibility to select one, several or all of the images within this subset, to be shared with the device 3 used by the target person.

In other words, proposing (b) to share said selected image with a device 3 used by the target person preferably comprises (b2) providing a personalized sharing button (on the user interface 13) for directly sending said selected image to a device 3 used by the target person. By "personalized", it is meant that the sharing button is designed as a function of the target person, in particular by displaying the target person's name.

Figure 3:
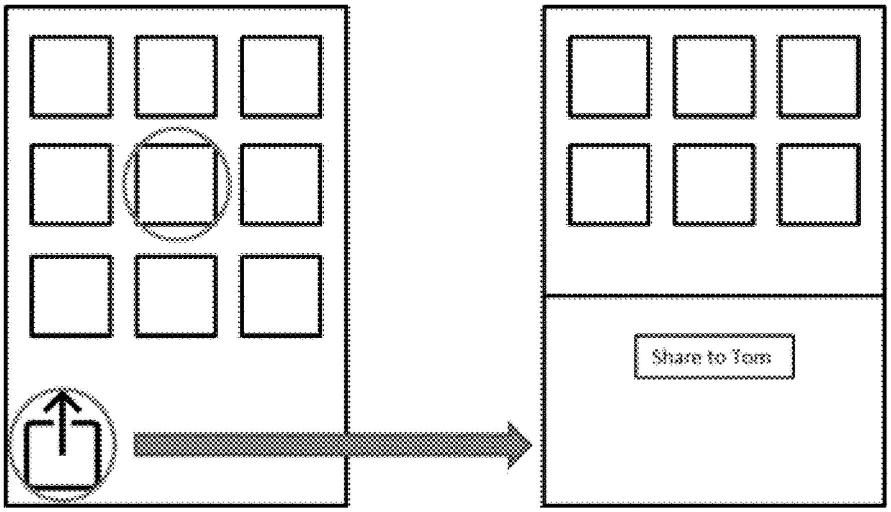
FIG. 3 represents an example of display when an embodiment of the method according to the development is performed.

An example of said button is visible on FIG. 3 ("Share to Tom"). By contrast, in the prior art, the user generally has to browse a contact list and to select a recipient to an image to be shared. Whenever personalized sharing buttons are provided in the prior art, they are generally directed at favorite recipients and/or recently contacted people, i.e. they are totally independently from the images and their contents.

In the case of a plurality of target people, several personalized sharing buttons can be provided at once (for instance "Share to Tom" and "Share to Jerry") and/or a personalized sharing button for sharing the selected image to all the target people at once (for instance "Share to Tom & Jerry").

If the user presses on said personalized button, the selected image is directly shared by message, e-mail or other communication channel. Note that the user could for instance set a predefined sharing channel, or even provide several personalized sharing button for the same target person corresponding to different channels (for instance "Share to Tom by message" and "Share to Tom by e-mail").

Note that the development is not limited to providing a personalized sharing button, as for instance the user could alternatively be automatically proposed to share the selected image to the target person, and they have just to press "yes" or "no".

In any case, the method advantageously comprises a further step (c) of actually sharing said selected image, i.e. sending it to a device used by said target person (if the user accepts the sharing proposition). For instance, if the second electronic device 3 is that of said target person, the selected image is send from the device 1 to the device 3 through the network 20. As explained, the target person preferably belongs to a contact list of the device, so that contact details associated to the target person are available, including an identifier of the target person such as a phone number or an e-mail address. Such identifier (contact information) may be directly used for sending the select image to device 3 used by the target person.

Said step (b) may follow an optional step (b0) of detecting a trigger event such as a pressing a dedicated button on the interface 13 (for example a "sharing" button, see FIG. 3), i.e. sharing said selected image to said device 3 used by the target person is proposed only after detecting said trigger event.

This trigger event may be of any type, in particular any action by the user on said interface 13 representative of an intent of sharing said selected image. Alternatively, the device 1 (more particularly the dedicated application) may be set to automatically provide "by default" the personalized sharing button as soon as an image is selected (i.e. we have permanently the right view of FIG. 3), i.e. no trigger is necessary.

Face Recognition

In order to be able to determine at step (a) that a selected image represents at least a target person, each image may advantageously be provided with information about the people represented.

The method thus preferably comprises a step (a0) of performing on said images a face recognition algorithm, so as to recognize (and preferably identify), for each image, the people represented by the image.

The face recognition technology is well known to the skilled person, it generally comprises a first phase to detect face(s), if any, within an image and a second phase to recognize a detected face, in particular by comparing it with already recognized "reference" faces.

To this end, the face recognition technology may determine parameters characterizing a face, for example so-called "facial landmarks" which mark the following facial regions: Mouth, Right/Left eyebrow, Right/Left eye, Nose, Jaw. Such landmarks parameters are thus output data of the face recognition process, which characterize the face as recognized, can be stored efficiently (in particular as a points array) and compared with other landmarks parameters using a similarity algorithm. Generally, a detected face is matched to a reference face if their similarity score is above a certain threshold.

Each image can be for instance associated, for each person represented by the image, with parameters characterizing the face of the person (landmarks parameters) or directly an identifier of the corresponding reference face(s).

Note that the face recognition technology is very convenient for constructing albums each defined by a reference face (i.e. containing all images representing a person with a face matching said reference face), thus albums are associated with a given person, this person being here "recognized" but actually not "identified".

By contrast, it would be preferable to actually identify the represented people (i.e. determine their name) and directly associate an image with name tag(s).

To this end, the present development proposes to astutely associate contact details (in the device 1) of at least one known person with their reference face or directly parameters characterizing said reference face. Hence, once a contact person of the device's user has been recognized in an image, the face recognition algorithm is able to identify this contact person.

Note that an associated name tag can be saved within the image file, or the name tag & an image identifier be stored in a unique database.

In every case, said step (a0) may be performed:

- entirely in advance, as in FIG. 2, i.e. the pre-recognition process is performed in background, or immediately at each time an image is added to the collection (acquired or received), which can reduce the workload of a whole process of face recognition. In such an embodiment, each image of the collection is assumed to have undergone the face recognition algorithm, and be associated to face data or even directly name tag(s) designing at least one contact. Thus, when an image is selected, the target person/people is (are) directly determined as the one(s) associated to the image.
- when detecting (a1) selection of an image: the selected image undergoes face recognition.
- in two phases: firstly face detection is typically performed before step (a), and then the actual face recognition (i.e. the matching of the landmark parameters, and possibly identification of name tags) is performed for the selected image.

Adapting a Subset of a Collection of Images

In a preferred embodiment step (b) comprises (b1) adapting a subset of said collection of images based on people represented in said images as a function of said target person; and displaying, on the interface 13 of the device 1, said subset of said collection of images, the displayed subset of images being arranged according to said adapting.

We refer to as an "arrangement" of the images a specific organization of the thumbnails on a given page, in accordance with how the images are filtered and/or sorted.

Indeed, if an image representing a target person is selected, the user may wish to further share further images of the collection representing said target person or related people. The idea of step (b1) is to gather images that the user may also wish to share without the need for browsing the whole collection.

Note that said step (b1) may be performed before and/or simultaneously with step (b2), as it is the case in FIG. 2 (only n=6 thumbnails ac displayed at once for providing the personalized sharing button, but possibly in a scrollable fashion). Note that the method may then comprise again detecting (a1) the selection of at least one further image, and the repetition of the method as new target people could be added, and then the selected image be proposed to be shared to said new target person, etc.

As already explained, adapting (b1) a subset of said collection of images comprises selecting and/or sorting said subset, preferably both.

Therefore, at least one of selecting and sorting is performed based on people represented in the images as a function of said target person (note that ta least one of selecting and sorting may still be based on at least one criterion other than people represented in the images, for instance date or location, i.e. the user may still apply filtering according to known criteria), possible both.

According to a first embodiment, adapting (b1) a subset of said collection of images thus comprises sorting said subset of said collection of images based on people represented in the images as a function of said target person.

"Sorting" means here only changing the order of the photos within a subset of images, but the subset is kept complete. In other words, after sorting, one is not restricted only to the photos representing a single person, as it may be the case in the prior art wherein sets of images, each comprising images representing the same person, are constructed: in particular, said sub-set sorted at sorting step (b) may comprise images representing at least two different people. This avoids the needs for accessing several sets of images one after the other.

To rephrase, the sorting just reorganizes the images of a subset to be displayed, without removing images from this subset.

Note that as explained said collection may have been incidentally filtered (i.e. restricted), so that not the whole collection of images is sorted and displayed. Thus, the method advantageous comprises, before sorting step, a step of selecting said subset of images within a larger collection of images, in particular based on at least one criterion other than people represented in the images (for instance date or location, i.e. the user may still apply filtering according to known criteria) and/or representing at least one person (anyone), i.e. said selected subset only contains images representing at least one person, so that are sorted and then displayed only the images representing at least one person (i.e. excluding images which does not represent any person, for example representing landscapes or animals).

Typically, the represented people are sorted, and the images' sorting simply follows this sorting, i.e. images representing the "first" person then the images representing the "second" person, etc. Note that each photo is preferably only displayed once (i.e. even if it represents several people).

Sorting the people is preferably performed according to a given criterion about said people, expressed with respect to the target person.

In the preferred embodiment wherein name tag(s) of contacts are identified, further criterion based on contact details and/or personal information can be used, such as:

- intimacy link level with the target person: the images can be sorted to have first images representing the target person, then images representing family members of this target person, then images representing close friends of this target person, then images representing friends of this target person, then images representing professional colleagues of this target person, and finally images representing "other" contact people of this target person.
  - the target person can have directly provided in their contact details said intimacy link level (for instance within a list comprising family, close friends, friends, professional colleagues, etc.);
  - The intimacy link level with the target person can be automatically determined based on a behavior or a relationship, for instance as indicated on a social media;
- latest social interactions, for instance on the basis of messages, phone calls, e-mails and/or various social networks. The images could be sorted to have first images representing the person having the most recent social interaction with the target person, then representing the second one, etc.;
- frequency of social interactions, for instance on the basis of the number of exchanged messages, phone calls and/or e-mails.

These embodiments based on contact details and/or personal information are really useful for improving sharing, because the sorting will automatically prioritize the images representing people to which the user is very likely to send these images.

According to a second embodiment, adapting (b1) a subset of said collection of images comprises selecting said subset of images within a larger collection of images based on people represented in the images as a function of said target person.

Similar criteria may be used, such as the selection of people having a given intimacy link level with the target person, such as "family", but alternatively could be simply selected in step the subset of said collection of images representing said target person. In other words, the collection is restricted to the images representing the target person, which simplifies the browsing and the sharing.

This embodiment can further comprise sorting said subset of said collection of images based on at least one criterion other than people represented.

As explained, the personalized sharing button may stay visible while the user keeps browsing the images.

Device and Computer Program

In a second aspect, the present development includes a device 1 comprising a processing unit 11, and user interface 13, possibly a memory 12 and/or a built-in camera 14, adapted for carrying out the method as previously described to share at least one image (possible to another electronic device 3).

Said processing unit 11 and said user interface 13 are configured to implement:

- determining (a) that a selected image represents at least a target person;
- proposing (b) to share said selected image with the device 3 used by said target person, preferably including:
  - adapting (b1) a subset of said collection of images based on people represented in said images as a function of said target person; and displaying, on the user interface 13 of the device 1, said subset of said collection of images, the displayed subset of images being arranged according to said adapting; and/or
  - providing (b2) a personalized sharing button, on the interface 13 of the electronic device 1, for directly sending said selected image to the device 3 user by the target person;
  - possibly send (c) said selected image to said device 3 user by the target person (if the user accepts the sharing proposition).

The development further proposes a computer program product, comprising code instructions for executing (in particular with a processing unit 11 of the device 1) a method according to the first aspect for operating an electronic device 1; and a computer-readable medium (in particular a memory 12 of the device 1), on which is stored a computer program product comprising code instructions for executing said method.

Although the development has been described above with reference to certain specific embodiments, it is to be understood that various modifications and adaptations may be made within the scope of the appended claims.

Various further aspects and features of, or related to, the present development are set out in the following numbered clauses.

1. A method for operating an electronic device characterized in that it comprises the steps of:

determining, by means of a processing unit of the electronic device, that a selected image represents at least one target person; and proposing, by means of a user interface of said electronic device, to share said selected image with a device used by said target person.

2. A method according to clause 1, further comprising a step of detecting a trigger event performed on the electronic device, the step of proposing to share said selected image with a device used by said target person being performed in response to said detection of a trigger event.

3. A method according to any one of clauses 1 and 2, wherein proposing to share said selected image with a device used by the target person comprises providing a personalized sharing button, on said user interface of the electronic device, for directly sending said selected image to the device used by the target person.

4. A method according to any one of clauses 1 to 3, further comprising a step of sending said selected image to said device used by said target person.

5. A method according to any one of clauses 1 to 3, wherein contact details of the target person are associated, in the electronic device, with an identifier of the target person for sending the selected image to the device used by said target person.

6. A method according to any one of clauses 1 to 5, wherein step of determining comprises detecting the selection of at least one image.

7. A method according to any one of clauses 1 to 6, wherein step of determining comprises performing on at least the selected image a face recognition algorithm in order to recognize at least one person in said selected image.

8. A method according to clause 7, wherein contact details of at least said target person are associated, in the electronic device, with a reference face of said target person and/or with parameters characterizing said reference face, the determining that said selected image represents at least a target person being performed based on said reference face and/or parameters.

9. A method according to any one of clauses 1 to 8, wherein said image is selected among a collection of images, comprising adapting a subset of said collection of images based on people represented in said images as a function of said target person; and displaying, on the user interface, said subset of said collection of images, the displayed subset of images being arranged according to said adapting.

10. A method according to clause 9, wherein adapting a subset of said collection of images comprises selecting and/or sorting said subset.

11. A method according to clause 10, wherein adapting a subset of said collection of images comprises selecting said subset of said collection of images based on people represented in the images as a function of said target person, in particular selecting the subset of said collection of images representing said target person.

12. An electronic device characterized in that it comprises a processing unit configured to determine that a selected image represents at least one target person and a user interface configured to propose to share said selected image with a device used by said target person.

13. A computer program product, comprising code instructions for executing a method according to any one of clauses 1 to 11 for operating an electronic device, when said method is executed by a processing unit.

14. A computer-readable medium, on which is stored a computer program product comprising code instructions for executing a method according to any one of clauses 1 to 11 for operating an electronic device.

The invention claimed is:

1. A method for operating an electronic device, the method comprising:

determining (a), by a processing unit of the electronic device, that an image, selected among a collection of images stored in the electronic device, represents at least one target person, by a facial recognition algorithm; and adapting a user interface of the electronic device for proposing (b) to share the selected image with a device used by the target person, wherein (b) comprises adapting (b1) a subset of the collection of images, based on a relationship between people represented in the subset of the collection of images and the target person and displaying, on the user interface of the electronic device, the subset of the collection of images, the displayed subset of images being arranged according to the adapting; and wherein the relationship corresponds to latest social interactions, according to a stored history of messages, phone calls, e-mails and/or social networks.

2. The method according to claim 1, further comprising (b0) of detecting a trigger event performed on the electronic device, the proposing (b) to share the selected image with a device used by the target person being performed in response to the detection of a trigger event.

3. The method according to claim 1, wherein proposing (b) to share the selected image with a device used by the target person comprises (b2) providing a personalized sharing button, on the user interface of the electronic device, for directly sending the selected image to the device used by the target person.

4. The method according to claim 1, further comprising sending (c) the selected image to the device used by the target person.

5. The method according to claim 1, wherein contact details of the target person are associated, in the electronic device, with an identifier of the target person for sending the selected image to the device used by the target person.

6. The method according to claim 1, wherein (a) comprises detecting (a1) the selection of at least one image.

7. The method according to claim 1, wherein contact details of at least the target person are associated, in the electronic device, with a reference face of the target person and/or with parameters characterizing the reference face, the determining (a) that the selected image represents at least a target person being performed based on the reference face and/or parameters.

8. The method according to claim 1, wherein adapting (b1) a subset of the collection of images comprises selecting and/or sorting the subset.

9. The method according to claim 8, wherein adapting (b1) a subset of the collection of images comprises selecting the subset of the collection of images based on people represented in the subset of the collection of images as a function of the target person, including selecting the subset of the collection of images representing the target person.

10. The method according to claim 1, wherein the relationship corresponds to an intimacy link level, including a family relationship, a friendship relationship, a professional colleague relationship.

11. An electronic device comprising:

a processing unit configured to determine (a) that an image, selected among a collection of images stored in the electronic device, represents at least one target person, by a facial recognition algorithm; and adapting a user interface configured to propose (b) to share the selected image with a device used by the target person and to display a subset of the collection of images, the displayed subset of images being arranged according to an adapting of the subset based on a relationship between people represented in the subset of the collection of images and the target person; and wherein the relationship corresponds to latest social interactions, according to a stored history of messages, phone calls, e-mails and/or social networks.

12. The electronic device according to claim 11, wherein (a) comprises performing (a0) on at least the selected image a face recognition algorithm in order to recognize at least one person in the selected image as the at least one target person.

13. The electronic device according to claim 12, wherein contact details of at least the target person are associated, in the electronic device, with a reference face of the target person and/or with parameters characterizing the reference face, the determining (a) that the selected image represents at least a target person being performed based on the reference face and/or parameters.

14. A processing circuit comprising a processor and a memory, the memory storing program code instructions of a computer program to execute the method according to claim 1 for operating an electronic device, when the computer program is executed by the processor.

15. A non-transitory computer-readable medium, on which is stored a computer program comprising program code instructions to execute the method according to claim 1 for operating an electronic device.

* * * * *